United States Patent [19]
Collette et al.

[11] Patent Number: 5,469,612
[45] Date of Patent: Nov. 28, 1995

[54] METHOD FOR FORMING A STRAIN-HARDENABLE PLASTIC CONTAINER

[75] Inventors: Wayne N. Collette, Merrimack; Suppayan M. Krishnakumar, both of Nashua, N.H.

[73] Assignee: Continental PET Technologies, Inc., Florence, Ky.

[21] Appl. No.: 160,963

[22] Filed: Dec. 2, 1993

[51] Int. Cl.⁶ .......................... B29C 49/08; B29D 22/00; B65D 23/10
[52] U.S. Cl. .......................... 29/453; 29/527.1; 215/396; 264/296; 264/534; 425/525
[58] Field of Search .................. 264/534, 296; 425/525; 215/100 A; 29/450, 453, 527.1, 774

[56] References Cited

U.S. PATENT DOCUMENTS

| | | |
|---|---|---|
| 3,764,644 | 10/1973 | Robinson .......................... 264/296 X |
| 4,044,092 | 8/1977 | Spears .......................... 264/318 |
| 4,207,284 | 6/1980 | Speas . |
| 4,257,525 | 3/1981 | Thompson . |
| 4,273,246 | 6/1981 | Thompson . |
| 4,280,859 | 7/1981 | Thompson . |
| 4,281,770 | 8/1981 | Rainville . |
| 4,363,415 | 12/1982 | Rainville . |
| 4,368,826 | 1/1983 | Thompson . |
| 4,368,827 | 1/1983 | Thompson . |
| 4,372,454 | 2/1983 | Thompson . |
| 4,604,044 | 8/1986 | Hafele . |
| 4,629,598 | 12/1986 | Thompson . |
| 4,915,241 | 4/1990 | Morimura et al. . |
| 4,952,133 | 8/1990 | Hasegawa et al. . |
| 4,964,522 | 10/1990 | Umetsu et al. .......................... 215/100 |
| 4,983,116 | 1/1991 | Koga . |
| 5,057,266 | 10/1991 | Belcher . |
| 5,167,970 | 12/1992 | Yoshino et al. . |

FOREIGN PATENT DOCUMENTS

| | | | |
|---|---|---|---|
| 220099 | 11/1957 | Australia .......................... | 264/534 |
| 1237243 | 6/1960 | France . | |
| 57-201632 | 12/1982 | Japan .......................... | 264/534 |
| 4-6043 | 1/1992 | Japan .......................... | 215/100 A |
| 8105605 | 7/1983 | Netherlands . | |

Primary Examiner—Karen Aftergut
Attorney, Agent, or Firm—Wolf, Greenfield & Sacks

[57] ABSTRACT

A method of making a blow-molded container from a strain-hardenable polymer, the container having deep recesses for secure "post mold" attachment of a handle. The container is formed in a modified blow mold having retractable blades. The blades are partially extended for blow molding partial recesses, and then further extended for mechanically forming the deep handle recesses. The mechanical forming operation overcomes the stretch limits imposed by strain-hardening of the plastic material during blow molding, and the "post-mold" attachment of the handle provides a reduced cycle time and lower level of defects compared to the known "in-mold" handle forming operations.

13 Claims, 11 Drawing Sheets

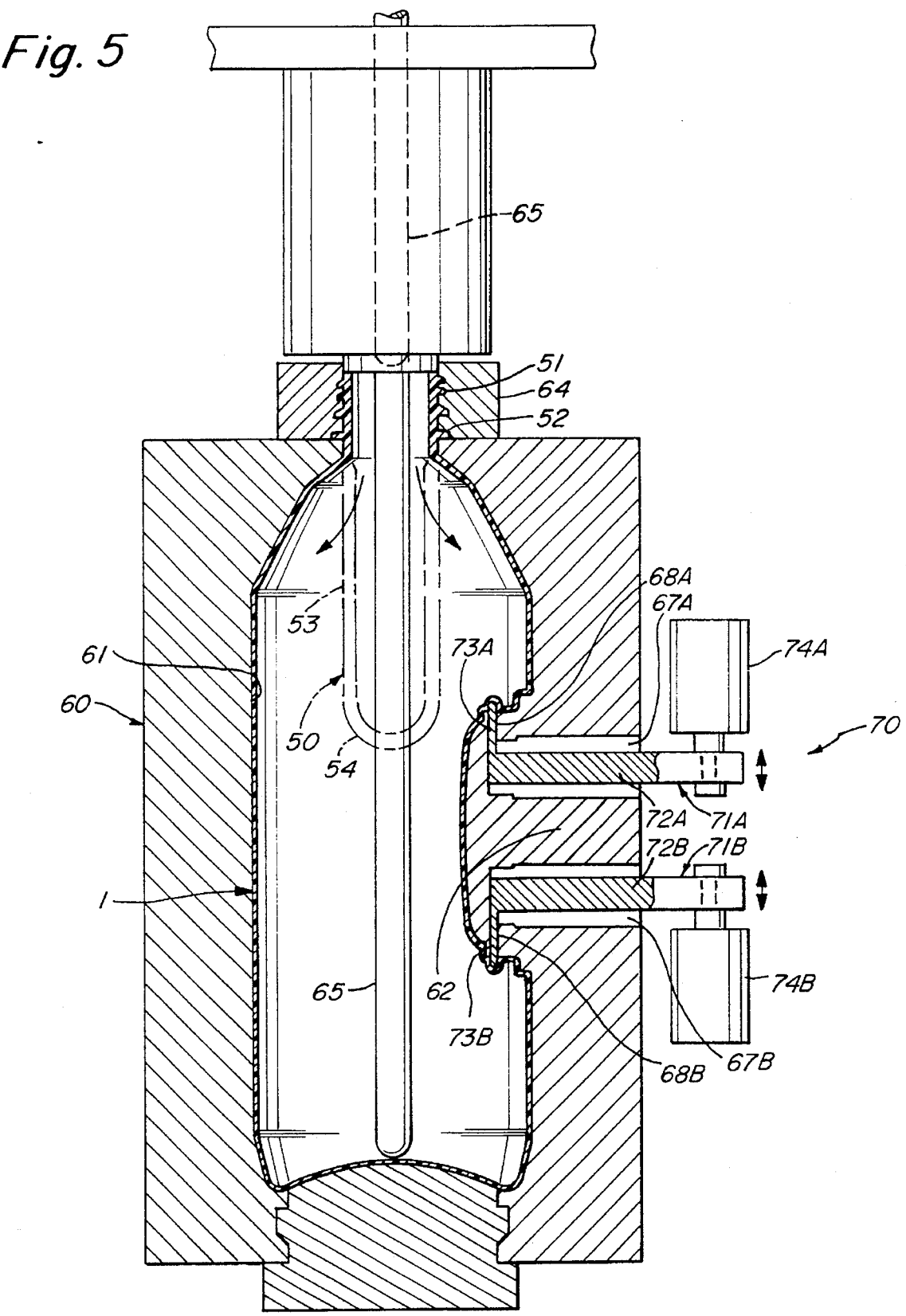

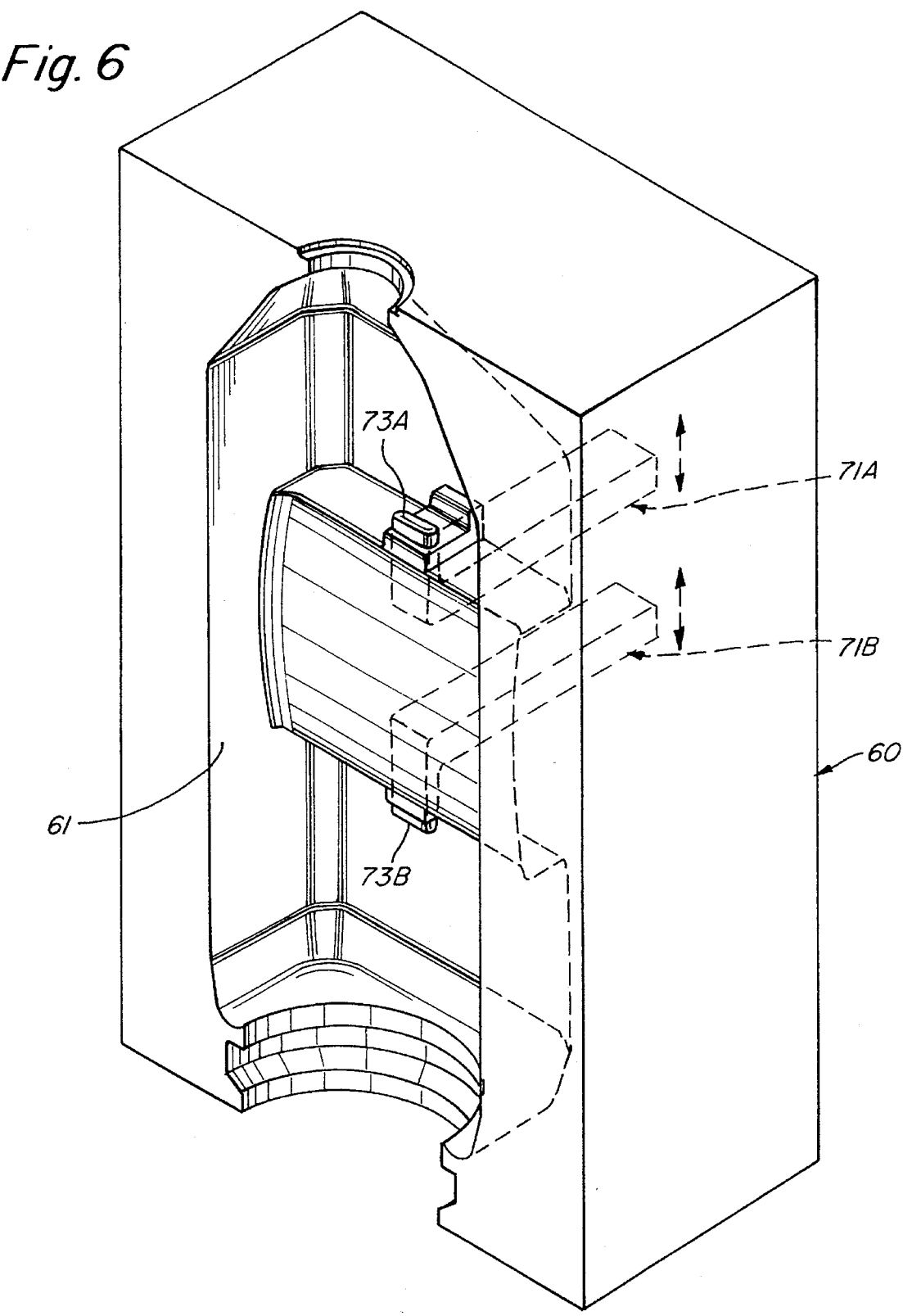

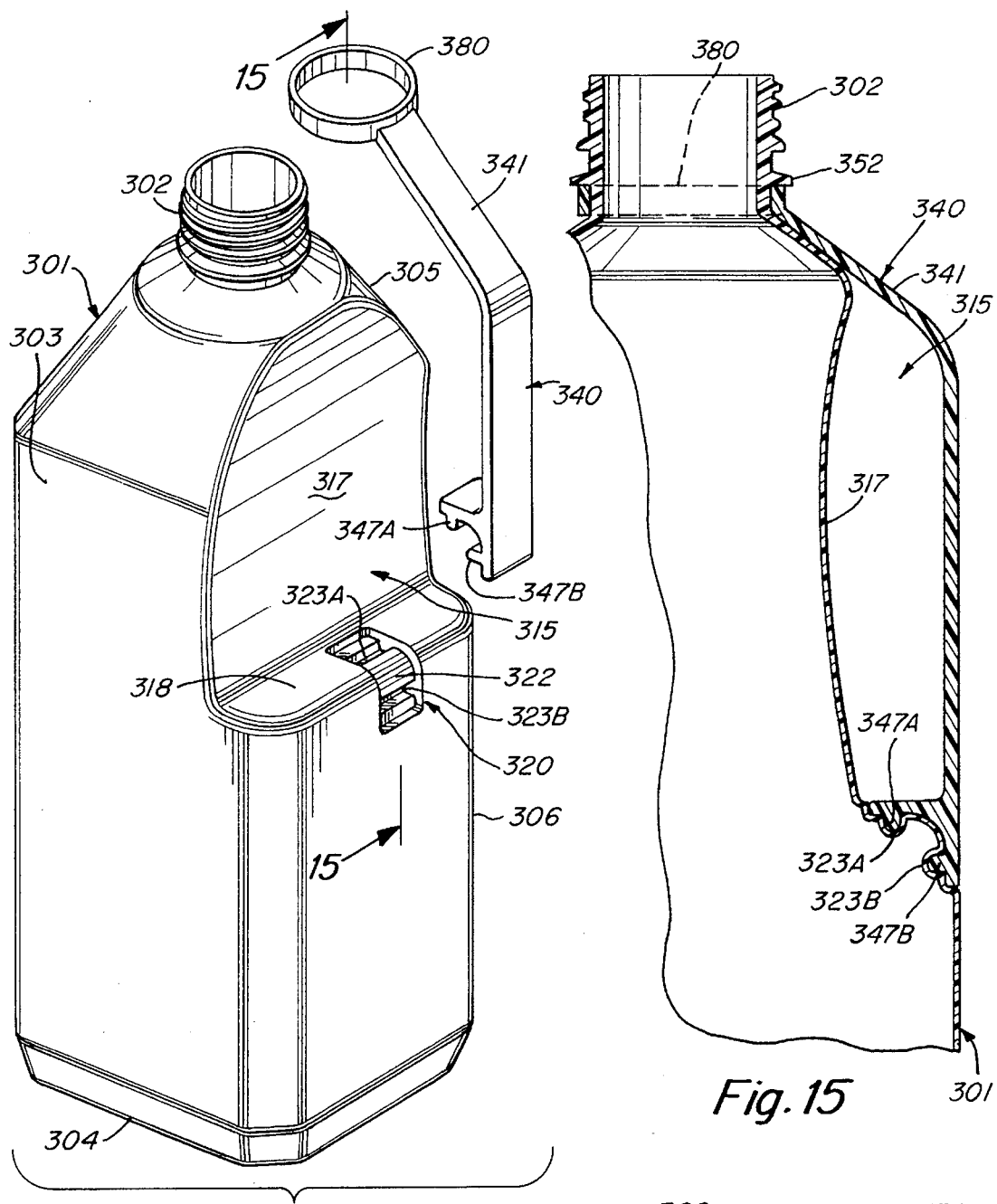
Fig. 14
Fig. 15
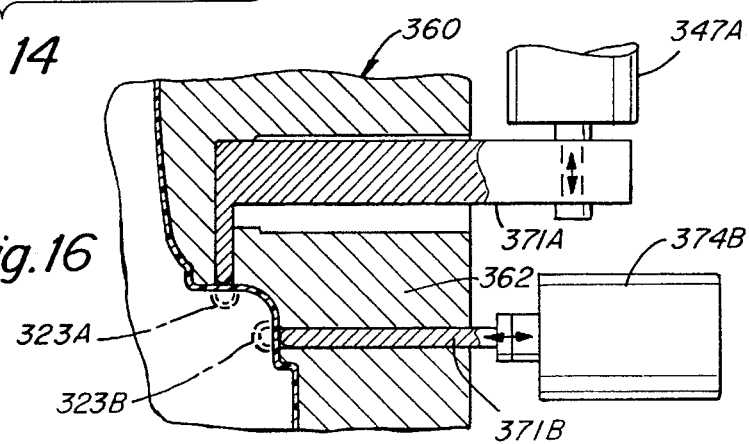
Fig. 16

METHOD FOR FORMING A STRAIN-HARDENABLE PLASTIC CONTAINER

FIELD OF THE INVENTION

This invention relates to a method and apparatus for forming a thermoplastic blow-molded container to which a handle is attached after removal from the blow mold, and more specifically to a container blow-molded from a plastic which exhibits strain-induced orientation and having a handle-attachment recess mechanically formed in the blow mold.

BACKGROUND OF THE INVENTION

Plastic containers are preferred for holding various liquid products, such as beverages and laundry detergents, because of their light weight and excellent impact resistance. These containers are typically prepared by blow molding a thermoplastic preform in a blow mold. A preferred thermoplastic is polyethylene terephthalate, hereinafter referred to as "PET", which has a high transparency, good gas-barrier property, a light weight, excellent impact resistance, and an appropriate rigidity.

To facilitate handling of large-size plastic containers, e.g., 2 liters or more, it is desirable to provide a handle. However, it is difficult to form a handle integrally with the container during the stretch blow-molding process because it complicates the preform and blow mold design and/or because of the limited stretch capabilities of the material. For example, thermoplastic polyesters such as PET strain-harden as they are stretched, making it difficult to form tight corners or deep grooves during blow molding.

Therefore, various other methods have been suggested for forming a handle. In one example, a separately formed handle is placed in the blow mold along with the preform, and then as the preform is expanded into a container the container becomes joined to the handle in the mold. Due to the strain hardening characteristic of PET, this technique results in inadequate handle engagement depth and poor resistance of the handle to disengagement. In another known method, a previously blown container is placed in an injection mold and a handle is injection molded onto the container. In both of these methods involving "in-mold" attachment of the handle and container, there is an increase in the expense of the equipment, the process time, and/or the level of defects.

It is an object of the present invention to avoid the expense and productivity loss of the prior known "in-mold" handle operations.

Another object is to enable the manufacture of a deep recess (i.e., tight corner or deep groove) in a strain-hardenable plastic container, such that a separate handle with an attachment member engaging the recess will not pop off the container during handling or drop impact.

SUMMARY OF THE INVENTION

According to the present invention, a method and apparatus are provided for forming a plastic blow-molded container having a mechanically formed recess for accepting an attachment member on a handle, wherein the handle is attached to the container "post-mold".

According to one embodiment of the invention, a handle is provided having a holding portion and at least one attachment member. The attachment member includes a boss designed to be snap-fit into a correspondingly shaped recess in the container. The container is blow molded from a strain-hardenable plastic material (such as polyester or nylon) in a cavity of a blow mold. The blow-molded container includes a neck finish for dispensing a product from the container, a closed base at its other end, and a sidewall therebetween. An extendable projection in the blow-mold cavity extends a first distance into the cavity for blow molding a partial recess in the sidewall of the container. The strain-hardening characteristic of the plastic material limits the depth of the partial recess. Following blow molding, the projection is mechanically extended further into the cavity to deepen the partial recess and form a full handle recess. The projection is then retracted and the container removed from the split mold halves. Retraction of the projection forming the undercut recess in the container allows easy removal of the container from the blow mold. The handle is then attached to the container by inserting the snap-fit boss into the recess.

In the blow mold apparatus of this invention, a retractable mechanism is provided for mechanically forming a deeper recess in the previously blown container while still in the blow mold. The blow mold includes a cavity for forming the blown thermoplastic container, including sidewall- and base-forming portions, with the sidewall-forming portion including at least one aperture for receiving the retractable mechanism. The retractable mechanism is movable in the aperture from a first retracted position in which it allows removal of the finished container from the mold, to a second extended position for forming the partial recess during blow molding, to a third extended position for mechanically forming the full handle recess in the container. The retractable mechanism may be a metal blade, separately heated or heated by contact with the mold cavity itself, which maintains the temperature of the container above the forming temperature of the thermoplastic, and wherein the blade is pushed further into the partial recess to form a relatively deep handle recess (i.e., a recess having a depth-to-width ratio of at least about 3:1). The handle recess is sized to receive a corresponding snap-fit boss on the handle, wherein the handle may be snap-fit onto the container.

The container of this invention is formed as previously described and in a first embodiment includes a blow-molded body having a sidewall opening and a pair of spaced recesses for accepting a pair of attachment members on the handle. The handle is disposed in the sidewall opening of the container, adjacent a center of gravity of the filled container, so that the moment imposed on the attachment members and central holding portion of the handle is small and the container is easy to handle. The handle may lie fully within the sidewall opening (i.e., within the breadth of the container), so that the container is compact for storage or transportation. The container and handle may be formed of the same or different materials, depending upon the desired strength, weight and appearance. The handle's holding portion may take various forms, such as an elongated bar with attachment members extending transversely therefrom, or an endless loop with attachment members connected directly thereto or via a transverse support member. The holding portion may be collapsible to reduce space in storage, while providing an enlarged holding area when expanded for use.

In another embodiment, an attachment member as previously described is disposed at one end of the handle and a ring is provided at the opposing end of the handle to be snap-fit around a neck flange on the open upper end of the container.

These and other embodiments and advantages of the present invention will be further defined by the following drawings and detailed description.

BRIEF DESCRIPTION OF THE DRAWINGS

FIG. 5 is a schematic cross-sectional view of a blow mold with retractable recess-forming blades for making the container of FIG. 1;

FIG. 6 is a perspective view of a right half of the blow mold of FIG. 5, showing the blades extending through apertures in the blow mold;

FIG. 14 is an exploded perspective view of a container and handle according to a fourth embodiment of the invention;

FIG. 15 is a fragmentary cross-sectional view of the assembled handle and container of FIG. 14;

FIG. 16 is a fragmentary cross-sectional view of a blow mold and recess-forming blades for forming the container of FIG. 14;

DETAILED DESCRIPTION

The present invention is a blow-molded thermoplastic container made from a strain-hardenable plastic material and having at least one mechanically formed recess for accepting an attachment member on the handle. The invention further includes a method and apparatus for forming the container.

A first embodiment of the container and handle of this invention is shown in FIGS. 1–4. An apparatus and method for making the same are shown in FIGS. 5–8.

Figure 3:
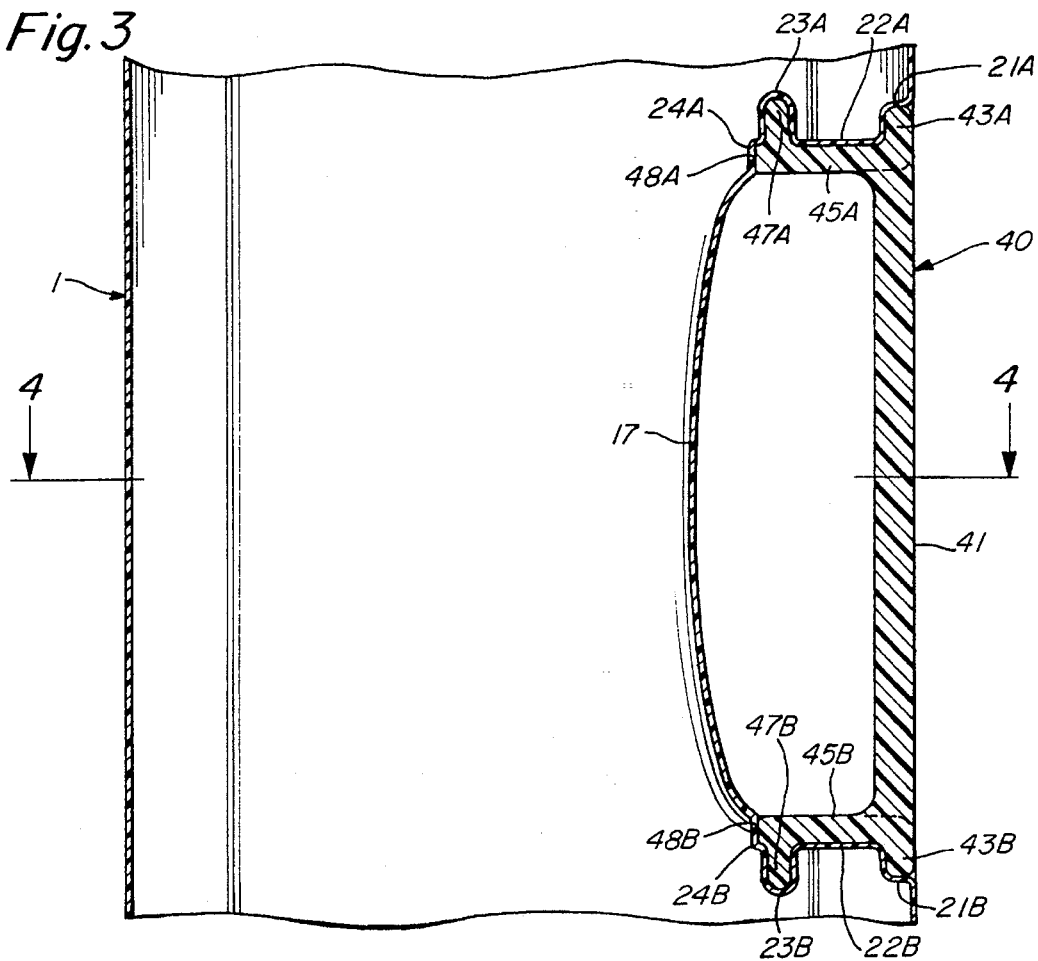
FIG. 3 is a fragmentary cross-sectional view taken along line 3—3 of FIG. 2, showing the assembled handle and container.
Figure 4:
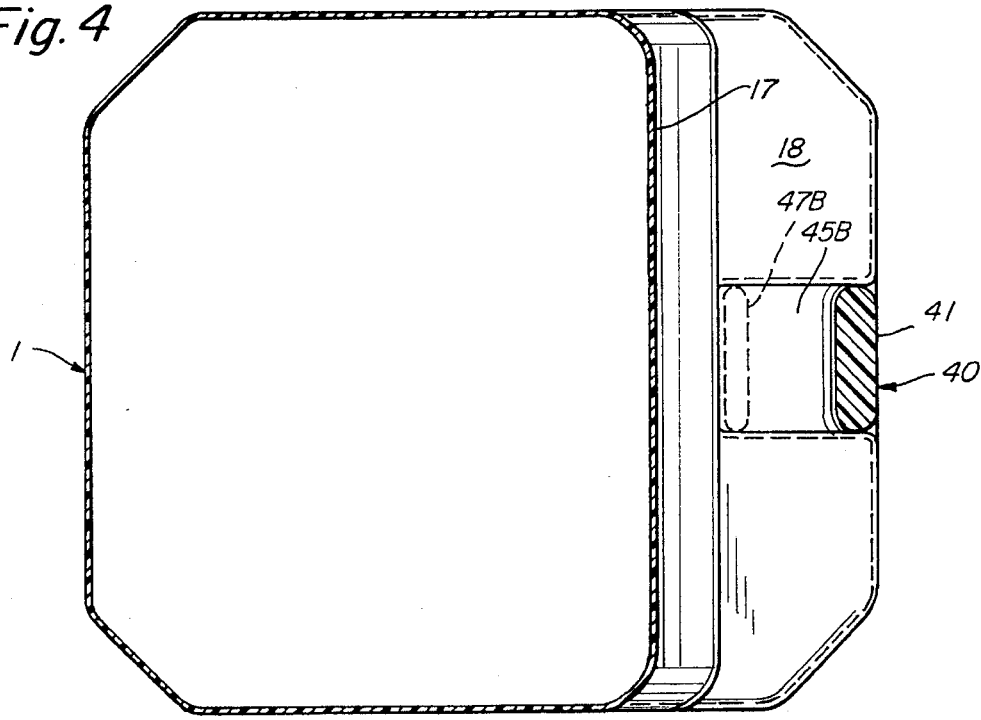
FIG. 4 is a cross-sectional view taken along line 4—4 of FIG. 3, showing the assembled handle and container.
Figure 7A:
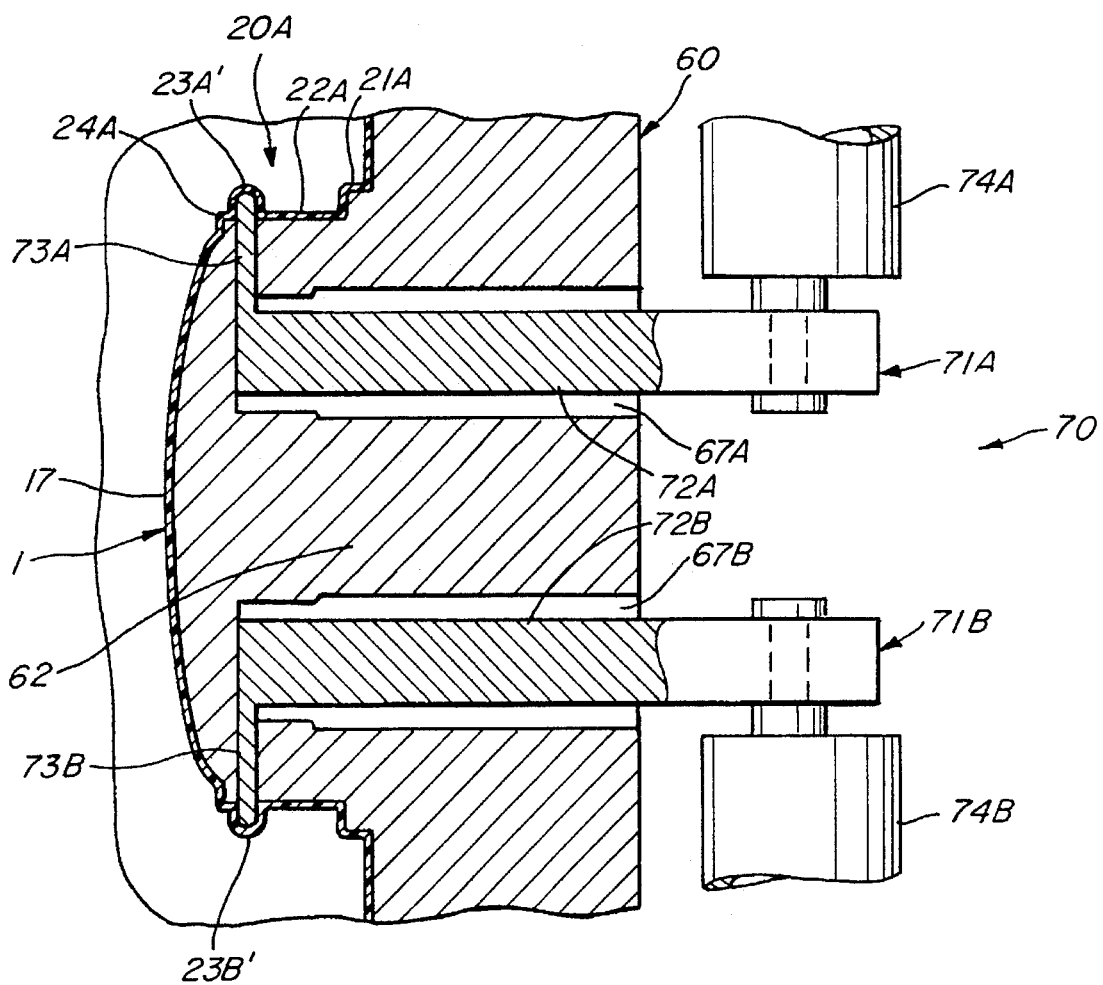
FIG. 7a is an enlarged fragmentary cross-sectional view of the recess-forming section of the blow mold of FIG. 5, with the blades partially extended into the container body during blow molding to form a partial recess.
Figure 7B:
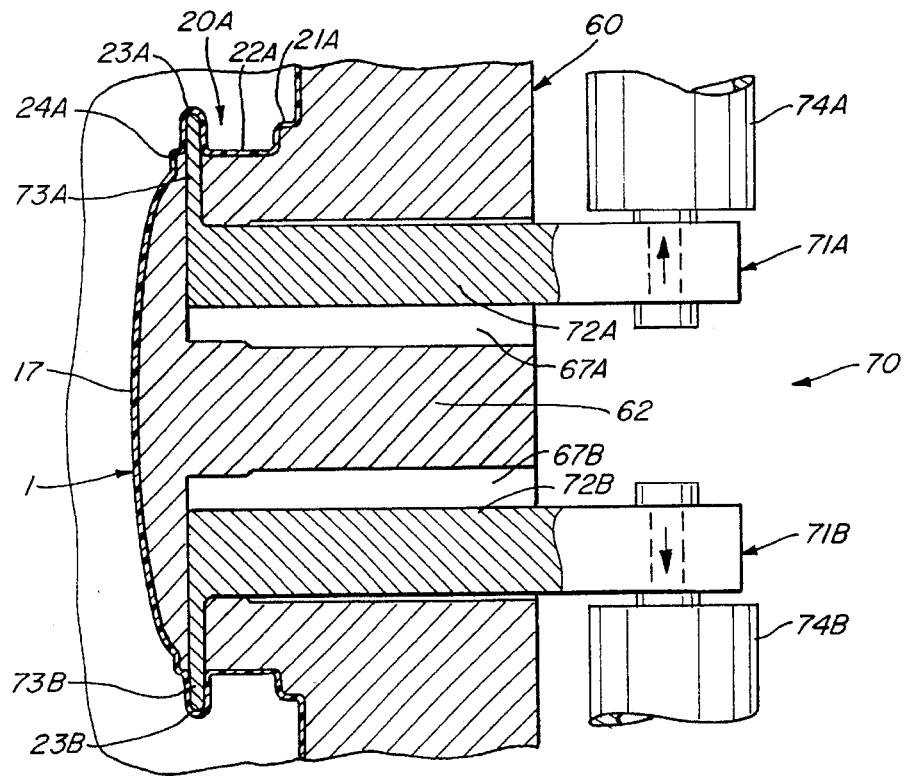
FIG. 7b is similar to FIG. 7a, but with the blades fully extended into the container body following mechanical forming to form a full handle recess.

A plastic container 1 has an open top end defined by a reduced-diameter cylindrical neck finish 2, with exterior threads for attachment of a cap (not shown). Below the neck is an enlarged diameter sidewall 3 and a closed base 4. In this embodiment the sidewall includes a panel 6 which is substantially rectangular in horizontal cross section, and a tapering shoulder 5 decreasing in diameter between the panel 6 and neck finish 2. A central opening 15 is provided in the sidewall, which forms a finger-receiving portion of the container. The opening 15 includes a substantially horizontal top wall 16, a substantially vertical and slightly outwardly concave back wall 17, and a substantially horizontal bottom wall 18. Adjacent to a vertical center plane of the container, and disposed in the opposing top and bottom walls 16, 18 of the opening 15, there are provided upper and lower aligned handle attachment portions 20A and 20B, respectively. Each portion includes an outer step 21, central platform 22, recess 23, and inner corner 24 (FIG. 3). All portions of the container are blow molded, except for the recess 23 which is both blow molded and mechanically formed as described hereinafter.

Figure 1:
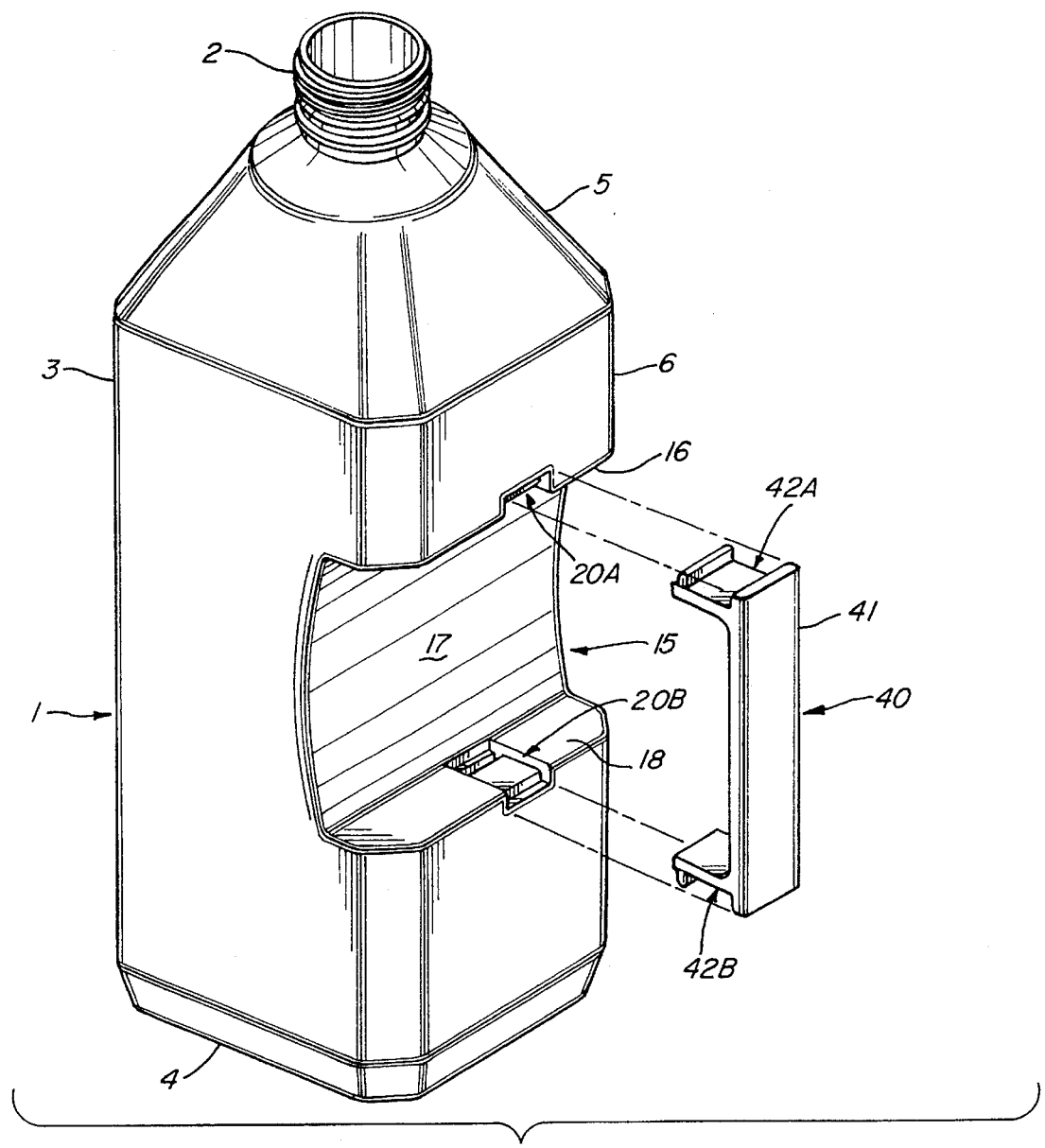
FIG. 1 is an exploded perspective view of a container and handle according to a first embodiment of the invention.
Figure 2:
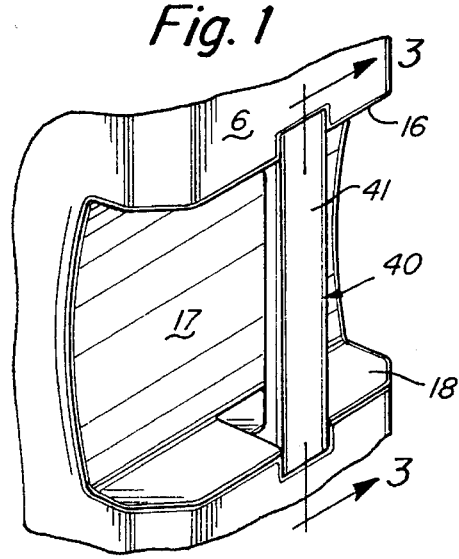
FIG. 2 is a fragmentary perspective view of the assembled handle and container of FIG. 1.

FIG. 2 shows a fragmentary perspective view of the assembled handle and container of FIG. 1. As further shown in the sectional views of FIGS. 3 and 4, the handle 40 includes a central elongated vertical bar forming a holding portion 41 and having at opposite ends thereof upper and lower attachment members 42A and 42B, respectively. The attachment members 42A and 42B are sized and shaped to be snap-fit into the correspondingly sized upper and lower attachment portions 20A and 20B of the container, as best shown in FIG. 3. Thus, outer flange 43 on the handle fits into outer step 21 on the container. Inner boss 47 on the handle fits within recess 23 on the container. Between the inner flange and outer boss is a recess 45 on the handle, which fits around the platform 22 of the container. The end 48 of the handle attachment portion abuts against the inner corner 24 of the container.

As best shown in FIG. 2, the handle 40 lies flush within the opening 15 of the container, to save space for storage and transport. To handle the container, the user grasps the holding portion 41 in one hand, wherein the opening 15 provides space for the fingers between the handle 40 and back wall 17 of the opening. Because the handle is disposed in the central opening 15 adjacent the center of gravity of the filled container, the moment imposed on the attachment portions and holding portion is small and the container is easy to handle. This is particularly important for larger size containers, e.g., 2 liters or larger.

FIGS. 5–8 illustrate an apparatus and method of forming the container of FIG. 1. FIG. 5 is a cross-sectional view of a blow mold 60 having a blow-forming cavity 61 in which the container is formed. A preform 50 has a threaded neck finish 51 and neck flange 52 which fits within a collett 64 at the top of the blow mold, for securing the preform in position. The preform includes a tubular body-forming portion 53 and a closed hemispherical bottom end 54. An axial stretch rod 65 extends down the center of the preform and axially elongates the preform either prior to or during hoop expansion, which hoop expansion is caused by a pressurized fluid (shown by arrows) injected into the interior of the preform. The expanded preform container 1 adopts the shape of the cavity 61, including the handle attaching portion 62 of the blow mold cavity as described below.

Figure 8:
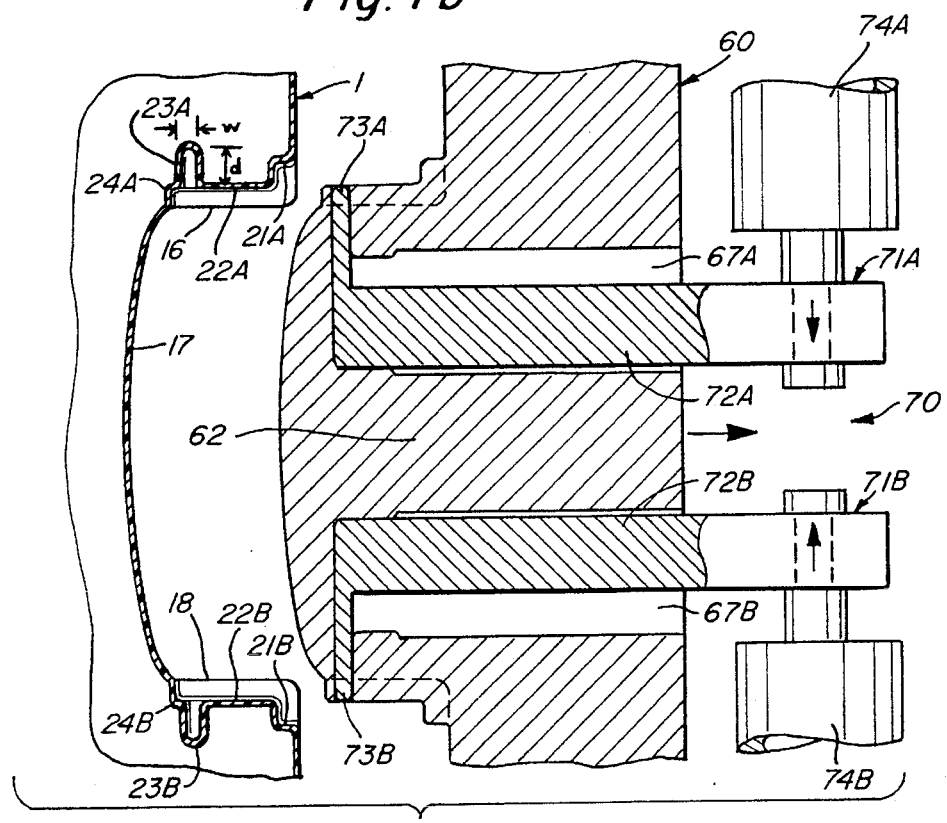
FIG. 8 is a view similar to FIGS. 7a and 7b, but with the blades retracted and the blow mold halves separated.

The sidewall opening 15 with upper and lower attachment portions 20A and 20B are formed as shown in FIGS. 5–8. The blow mold includes a section 62 extending radially inwardly toward the vertical centerline of the container and which forms the top wall 16, back wall 17, and bottom wall 18 of the opening. It also forms part of the upper and lower attachment portions 20A and 20B. A recess-forming mechanism 70 includes upper and lower cylinders 74A and 74B respectively which actuate upper and lower blades 71A and 71B between retracted, partially extended and fully extended positions. Each blade includes a horizontal main arm 72A, 72B movable in a horizontal channel 67A, 67B in the blow mold, and a vertical projection 73A, 73B at one end of the arm which is movable in a vertical channel 68A, 68B between mold sections 60 and 62 to form the recesses 23A, 23B. During blow molding, the opposed vertical projections 73A and 73B are partially extended from channels 68A, 68B and extend inwardly from adjacent portions of the blow mold to form partial recesses 23A' and 23B' (see FIG. 7a). Following blow molding, and while the blown container is at the forming temperature of the thermoplastic material, the blades are moved further inwardly against the outer surface of the container to a fully extended position to form full recesses 23A and 23B in the container (see FIG. 7b). In this example the full recesses are at least about twice as deep as the partial recesses. Following formation of the recesses, the container is cooled and the blade projections 73A and 73B are fully retracted into the channels, allowing the split mold 60 to be opened and the container easily removed, as shown in FIG. 8.

The formed container is now ready to accept the handle. The handle can be manually or mechanically attached by snap-fitting the inner bosses 47A and 47B into the upper and lower recesses 23A and 23B. Also, outer flanges 43A and 43B on the handle fit within the outer notched corners 21A and 21B of the container. This handle attachment mechanism, disposed adjacent the center of gravity of the filled container, provides a secure attachment for a large size container holding a heavy product, such as 4-liter liquid laundry detergent bottle.

Figure 9:
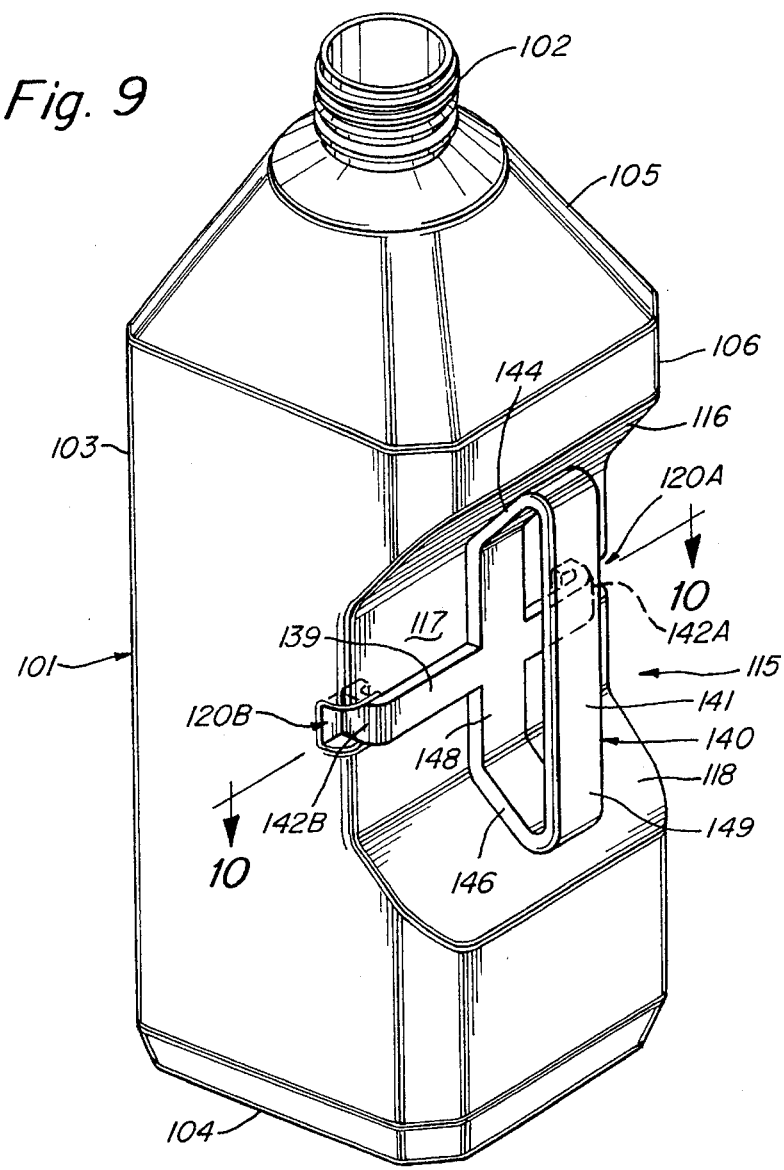
FIG. 9 is a perspective view of a container and handle according to a second embodiment of the invention.
Figure 10:
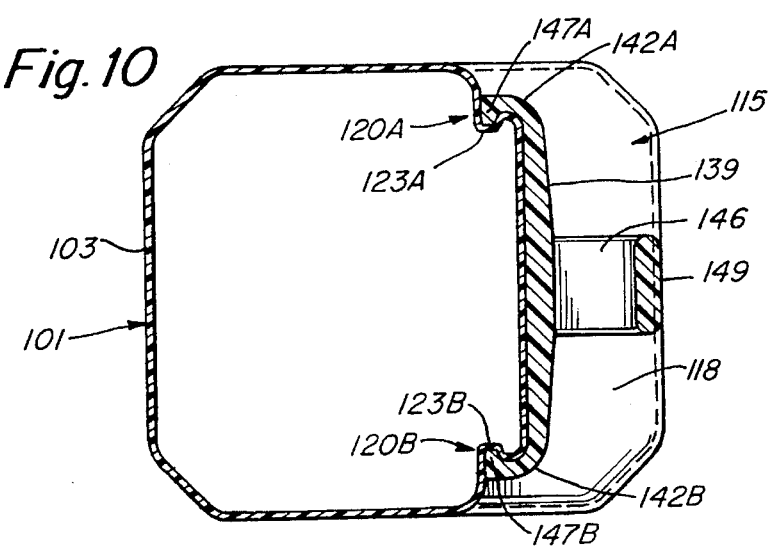
FIG. 10 is a cross-sectional view taken along line 10—10 of FIG. 9, showing the assembled handle and container.
Figure 11:
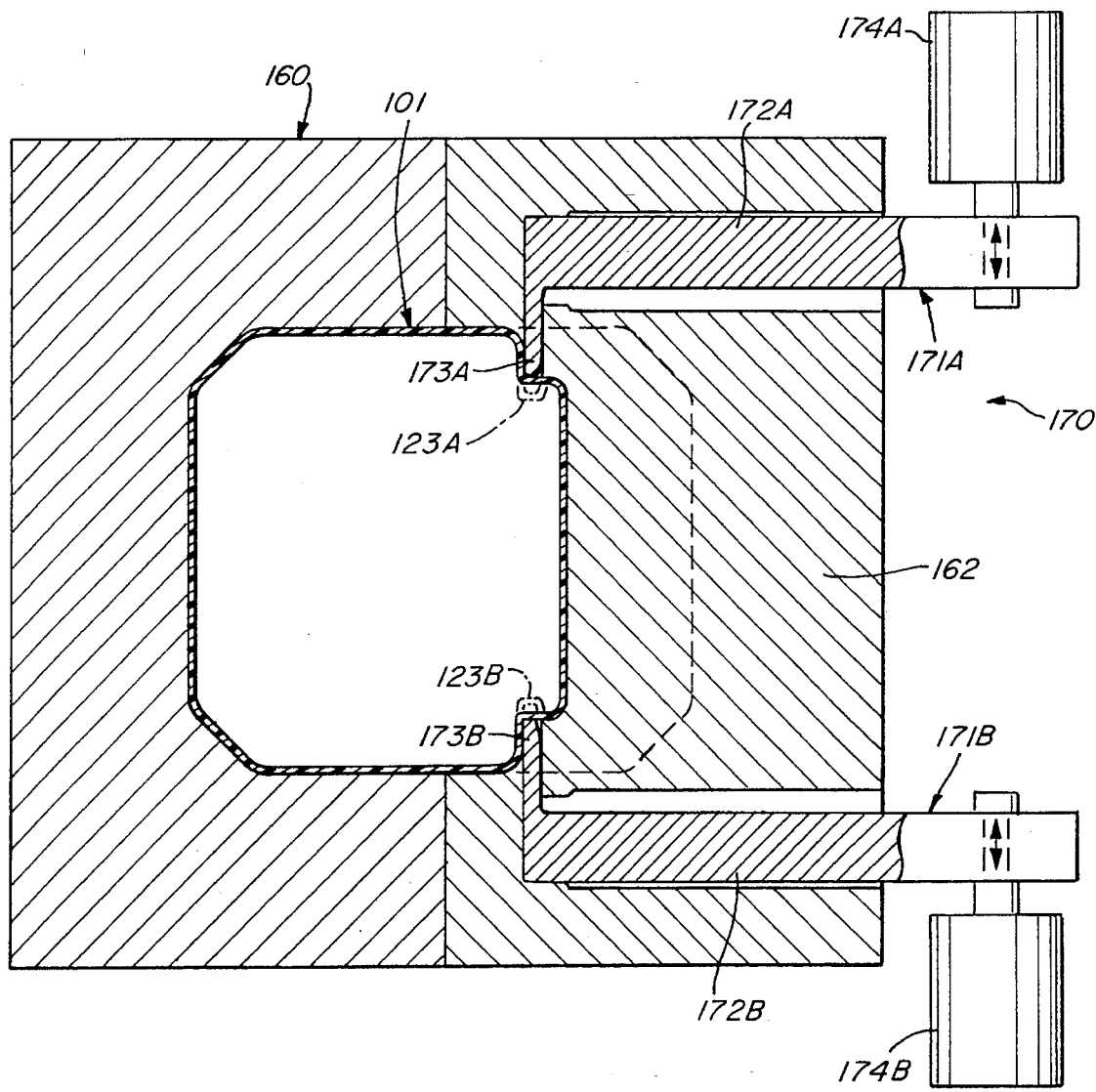
FIG. 11 is a cross-sectional view of the blow mold and recess-forming blades for making the container of FIG. 9, with the extended blades shown in phantom.

FIGS. 9-11 show a container and handle according to a second embodiment of the invention, and an apparatus for forming the same. In the second and later described third through fifth embodiments, like components are designated by the addition of "100", "200", "300" or "400" to the corresponding reference number.

The container 101 of FIG. 9 is substantially similar to the container 1 of FIG. 1, except that handle attachment portions 120A and 120B are provided at the right and left sides of the sidewall opening 115 (rather than at the top and bottom as in FIG. 1), and the shape of the opening 115 is modified to accommodate a cross-bar handle 140. The handle 140 has a vertical endless loop holding portion 141, attached to a horizontal crossbar 139 at the vertical midline of the inner portion 148 of the loop, and left and right attachment members 142A and 142B (at the ends of crossbar 139) snap-fit into respective attachment portions 120A and 120B of the container. The vertical loop 141 has parallel spaced inner and outer bar portions 148 and 149, with outer portion 149 being longer than inner portion 148, and upper and lower diverging bar portions 144 and 146 connecting the inner and outer vertical portions. The top and bottom walls 116 and 118 of the opening 115 also diverge outwardly and lie flush with the diverging upper and lower portions 144 and 146 of the handle. The back wall 117 of the opening is vertical, to lie flush with the vertical inner portion 148 and horizontal crossbar 139 of the handle. Bosses 147A and 147B at opposite ends of crossbar 139 fit within the left and right recesses 123A and 123B of the container.

Numerous variations of the handle and attachment portions shown in FIGS. 1 and 9 will be readily apparent to those skilled in the art. The principal feature of both embodiments is that they provide a pair of spaced attachment members which are disposed in a pair of recesses in the central sidewall of the container, adjacent the center of gravity.

FIG. 11 shows a modified recess-forming member 170, similar to the apparatus of FIG. 5, but adapted to provide recesses 123A and 123B on opposing vertical sides of the container 101 of FIG. 9. Thus, subsequent to blow molding partial recesses 123A' and 123B' in container 101 in mold 160, removable blades 171A and 171B are actuated by cylinders 174A and 174B to mechanically form full recesses 123A and 123B on the left and right sides of the opening 115. After forming the full recesses, the blades are retracted, the blow mold halves opened, and the handle attached to the container.

Figure 12:
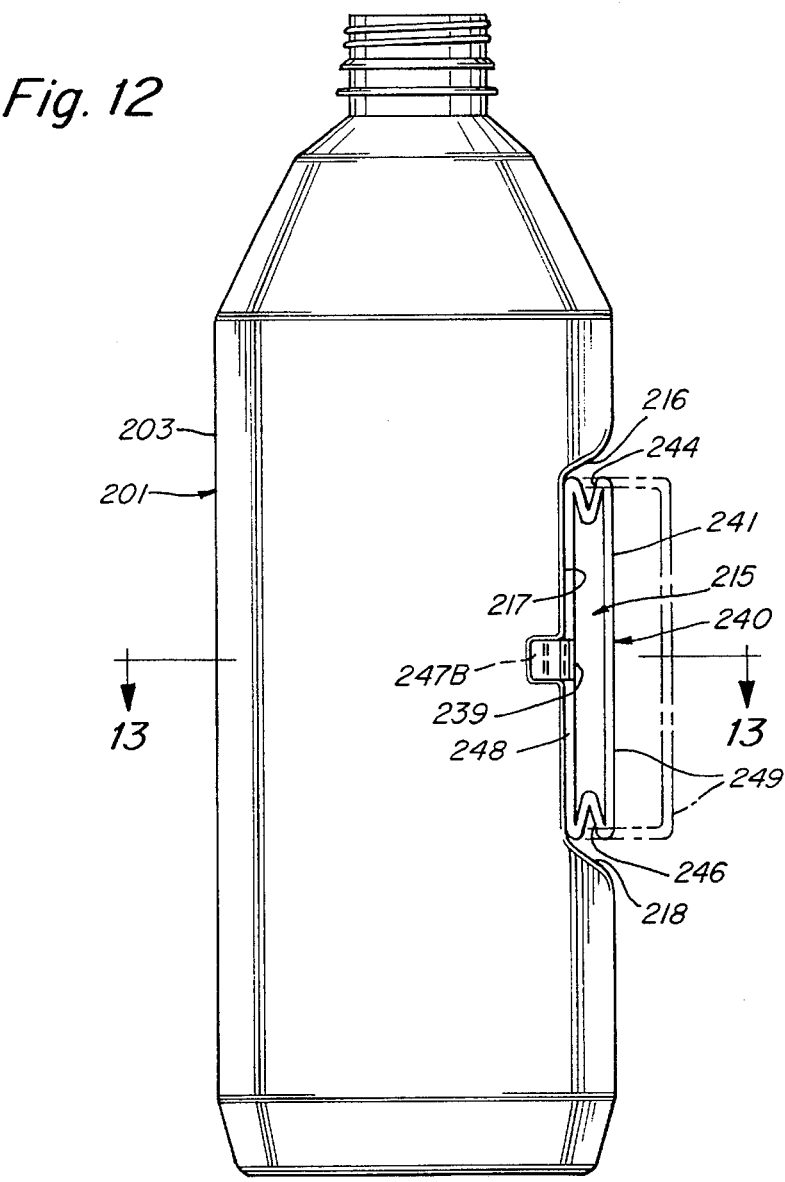
FIG. 12 is a side elevational view of a container and handle according to a third embodiment of the invention, having a collapsible handle.
Figure 13:
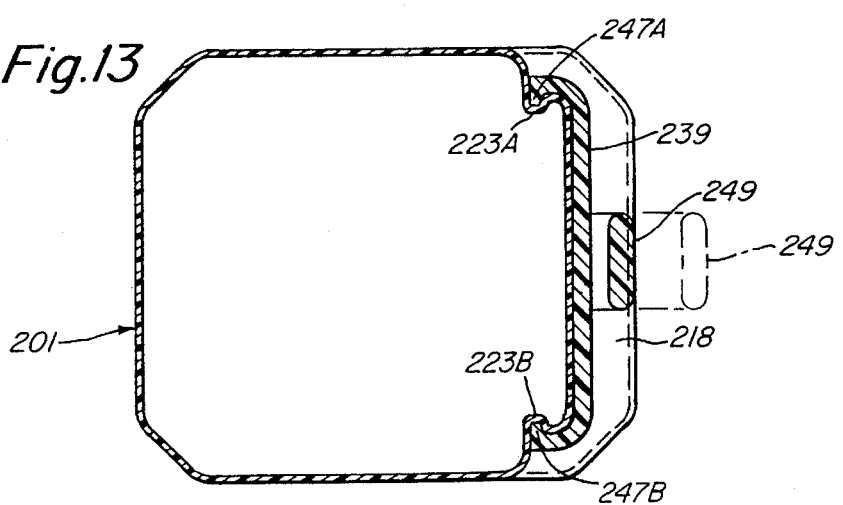
FIG. 13 is a cross-sectional view taken along line 13—13 of FIG. 12, showing the assembled handle and container.

FIGS. 12-13 illustrate a third container embodiment of the present invention. The container 201 and handle 240 are most similar to the container 101 and handle 140 of FIG. 9, except that a substantially shallower sidewall opening 215 is provided in the container and the handle is collapsible to accommodate the shallower opening. In this embodiment, the handle 240 has an endless loop holding portion 241 which in this case is substantially rectangular. The upper and lower connecting portions 244 and 246 (between inner and outer portions 248 and 249) form collapsible accordion members which enable the width of the handle to be reduced for storage within the shallow opening 215 in the container. Again, the handle attachment portions are on the left and right sides of the container opening 215, and include recesses 223A and 223B which receive bosses 247A and 247B on opposite ends of vertical crossbar 239. The container of FIG. 12 is made in an apparatus similar to that shown in FIG. 11.

FIGS. 14-16 show a fourth container embodiment of the present invention. In this embodiment, a recess and boss attachment is provided at the lower end of the handle, while a snap-fit ring 380 is disposed at a top end of the handle to fit around a neck flange 352 of the container. Thus, as shown in FIG. 14, container 301 has a neck finish 302, substantially rectangular body 303 and closed bottom end 304. The body includes upper tapered shoulder 305 and substantially vertical panel 306. An L-shaped opening 315 is formed in the upper body and includes a vertical back wall 317 and horizontal bottom wall 318. In the bottom wall 318 there is formed an attachment portion 320 having a pair of recess 323A and 323B in substantially horizontal and vertical directions, and a raised platform 322 between the recesses. The handle 340 includes a somewhat L-shaped holding portion 341 having at the upper end a ring 380 which is sized to be snap-fit over the neck of the container and rest securely under the neck flange 352 during use as shown in FIG. 15. At the lower end of holding portion 341 are a pair of transversely disposed bosses 347A and 347B sized and spaced to fit within the complimentary recesses 323A and 323B of the container. Again, the recess and boss attachment portion is provided near the center of gravity of the container for secure attachment, while the ring fits securely under the container neck flange. FIG. 16 shows a portion of an apparatus for forming the transversely disposed recesses 323A and 323B. Similar to the apparatus in FIGS. 5 and 11, a pair of movable blades 371A, 371B (in this case horizontal and vertical) are actuated by cylinders 374A, 374B between mold portions 360, 362 to move against the outer surface of the container to form the recesses.

Figure 17:
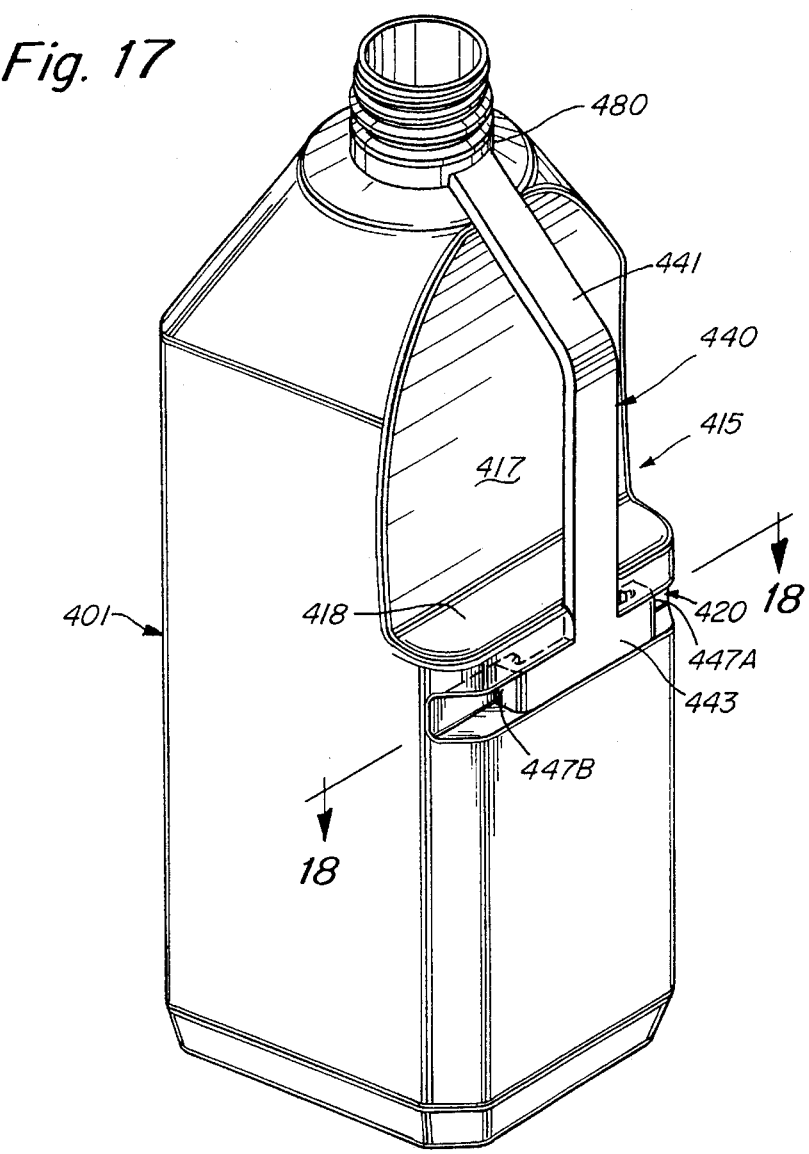
FIG. 17 is a perspective view of a container and handle according to a fifth embodiment of the invention.
Figure 18:
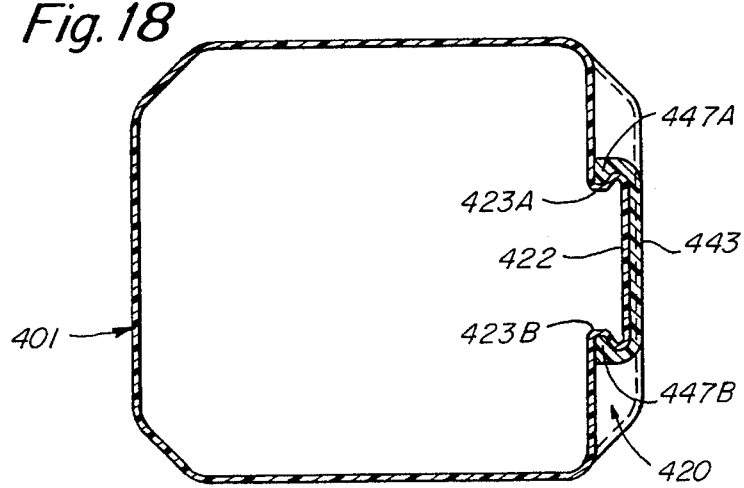
FIG. 18 is a cross-sectional view taken along line 18—18 of FIG. 17, showing the assembled handle and container.

FIGS. 17-18 show a fifth container embodiment of the present invention. This embodiment is most similar to the fourth embodiment of FIG. 14, having an L-shaped container opening 415 (with back wall 417 and bottom wall 418) and a handle 440 with an upper neck ring 480 and an L-shaped handle bar 441. The difference is at the bottom end of the handle, wherein a pair of attachment bosses 447A, 447B at opposing ends of horizontal crossbar 443 fit within a separate horizontal attachment opening 420 in the container sidewall below the main opening 415. The second opening 420 includes a central platform 422 between left and right recesses 423A and 423B. Also, the recesses are moved radially inwardly closer to the center of gravity. Otherwise, the operation of the container and handle of the fifth embodiment is similar to that of the fourth embodiment.

The blow-formable strain-hardenable thermoplastic resins useful in this invention are well known to persons skilled in the art. A strain-hardenable resin such as PET is a crystallizable resin which will strain orient and crystallize during blow molding, the amount of strain-induced crystallization depending on the temperature, rate of extension, molecular weight, and stretch ratio. The increasing crystallization limits the amount the polymer will stretch during blow molding, making it difficult or impossible to blow mold a deep and narrow recess. For example, with bottle grade PET an upper limit on the dimensions of a blow-moldable recess in a commercial container is a depth-to-width ratio of about 2:1. In accordance with this invention, a blow-molded recess approaching the upper limit can first be made, and then the movable blades used to further extend (deepen) the recess to a depth-to-width ratio (d:w) of at least about 3:1 (see FIG. 8). The increased forced exerted by the mechanical blades overcomes the strain hardening characteristic of the polymer which resists further extension at the blow pressure.

For example, there are polyesters which can be used such as polyethylene terephthalate (PET) homopolymer and copolymers, polybutelyne terephthalate, polyethylene naphthalate (PEN), nylons such as nylon-6, nylon-6,6 and copolymer nylons thereof. The handle-forming resin may be the same or different than the resin for the container. Other handle resins which do not strain harden include polyethylene, an ethylene/propylene copolymer, an ethylene/butene-1 copolymer and a styrene/butadiene thermoplastic elastomer. Various additives such colorants and fillers may be incorporated into the container or handle-forming resins.

In the present invention, blow-molding or stretch blow-molding of a preform can be carried out according to customary procedures. As used herein, "preform" is intended to include an injection molded or extruded preform or parison which are commonly used in the industry for blow molding containers. Bottle grade PET is in widespread use, and may include copolymers such as isophthalic acid (IPA) and cyclohexane dimethanol (CHDM), e.g., Eastman 9663 (homopolymer), Eastman 9921D (1.5 mole % CHDM copolymer), Eastman 9921 (3.5 mole % CHDM copolymer), all available from the Eastman Chemicals Division of Eastman Kodak Co., Kingsport, Tenn. In the case of bottle grade PET, the forming temperature is above the glass transition temperature ($T_g$) but well below the melting point, and generally is in the range of from about 80° to about 130° C., which is suitable both for blow molding and mechanically forming the handle attachment recesses.

While there have been shown and described several embodiments of the present invention, it will be obvious to those skilled in the art that various changes and modifications may be made therein without departing from the scope of the invention as defined by the appending claims.

What is claimed is:

1. A method of forming a strain-hardenable plastic container with handle comprising:

stretch blow molding a strain-oriented container from a preform in a cavity of a blow mold, the preform being made of a strain-hardenable thermoplastic material, the mold having at least one extendable projection forming a partial recess of a first depth in the container as the material is blow molded over the projection at a forming temperature above $T_g$ of the thermoplastic material, the first depth of the partial recess being limited by strain hardening of the thermoplastic material during the stretch blow molding such that the partial recess has a depth-to-width ratio of up to about 2:1;

then mechanically extending the first depth of the partial recess to a greater second depth by extending the projection further into the recess to form a handle recess of the second depth and having a depth-to-width ratio of at least about 3:1;

mechanically retracting the extendable projection and removing the container with the handle recess from the blow mold; and attaching a handle to the container by engaging an attachment member on the handle with the handle recess.

2. The method of claim 1, wherein the strain-hardenable thermoplastic material is polyester.

3. The method of claim 2, wherein the strain-hardenable thermoplastic material is a homopolymer or copolymer of polyethylene terephthalate.

4. The method of claim 1, including forming a pair of handle recesses in the container, and wherein the handle has a pair of spaced attachment members for engaging the handle recesses.

5. The method of claim 1, wherein the blow-molded container is formed with a volume of at least about 2 liters.

6. The method of claim 1, wherein the blow-molded container has a neck finish at one end, a base at its other end and a sidewall therebetween, and wherein an opening is formed in the sidewall which receives the handle.

7. The method of claim 6, wherein the opening is formed with opposed top and bottom walls and a connecting back wall forming a space for finger placement through the opening, and wherein a pair of handle recesses are formed in the opposing top and bottom walls for engaging a pair of attachment members on opposite ends of the handle.

8. The method of claim 6, wherein the container has a flange on the neck finish and a pair of handle recesses in the sidewall, and the handle has a pair of attachment members at a lower end which engage the handle recesses and a ring at an upper end which engages the neck flange.

9. The method of claim 1, wherein the attachment member on the handle is an enlarged boss which is snap fit into the handle recess.

10. The method of claim 1, wherein the blow mold includes a pair of extendable projections comprising movable blades.

11. The method of claim 10, wherein the blades are movable in substantially opposite axial directions to form a pair of opposed handle recesses.

12. The method of claim 10, wherein the blades are movable in substantially transverse directions to form a pair of transverse handle recesses.

13. The method of claim 1, wherein the handle is attached proximate a center of gravity of the container.

* * * * *